United States Patent Office 2,724,770
Patented Nov. 22, 1955

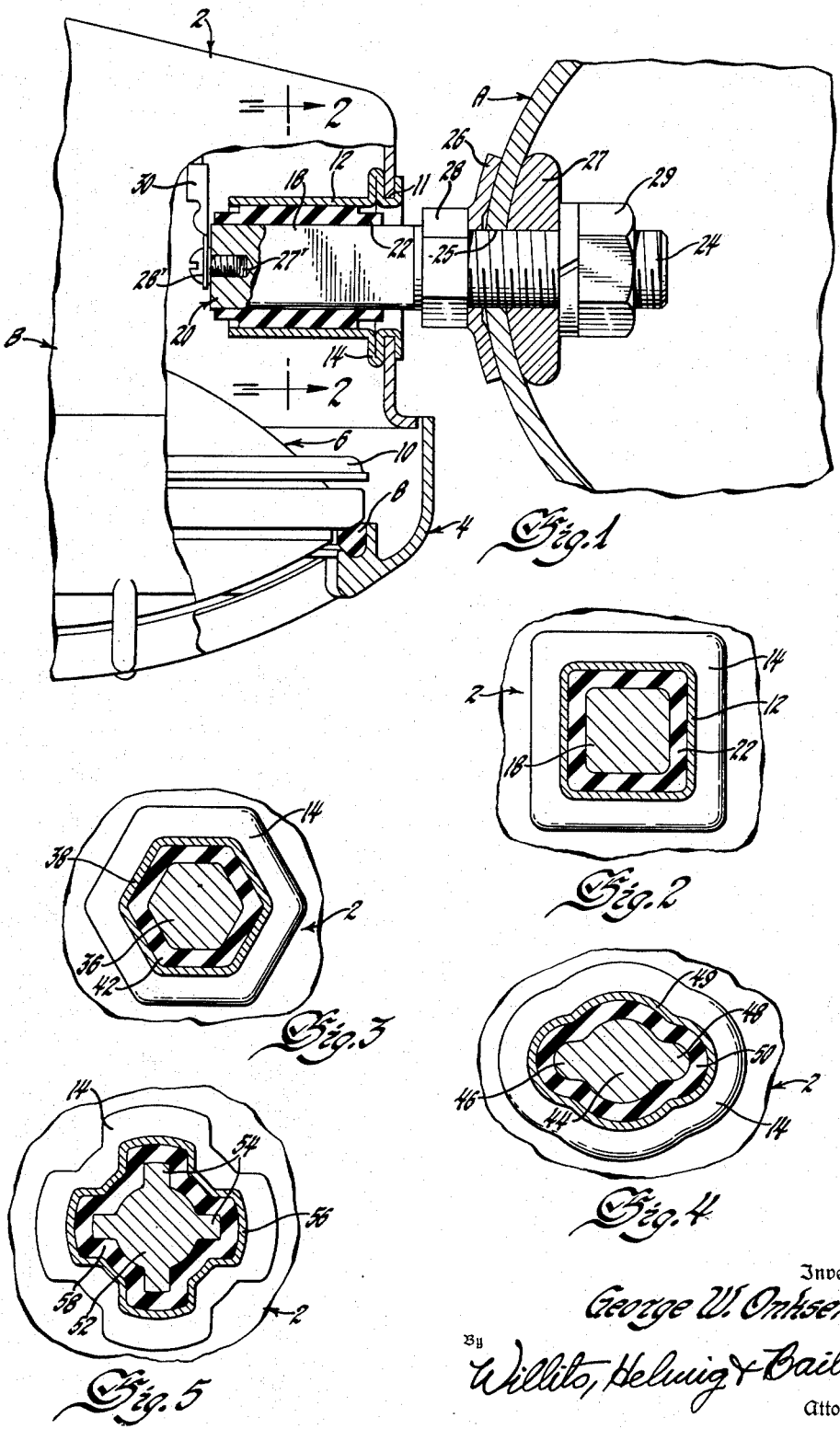

2,724,770

RESILIENT HEADLIGHT MOUNTING

George W. Onksen, Jr., Anderson, Ind., assignor to General Motors Corporation, Detroit, Mich., a corporation of Delaware Application February 21, 1952, Serial No. 272,843

10 Claims. (Cl. 240—90)

The present invention relates to headlight mountings and more particularly to shock absorbing mountings adapted for headlights used on heavy duty tractors or other vehicles subject to frequent vibration producing jars and shock.

It is well known that the various parts of moving vehicles such as headlamps are caused to vibrate during operation thereof. This is especially true in the case of heavy duty vehicles that travel across country rather than over improved roads. Such impact or shock vibrations, if unchecked, eventually cause structural damage to the lamps particularly, to the bulb filaments and wiring connections. Numerous attempts have been made to overcome this problem, among the more notable being the use of rubber sleeves bonded between the supporting bolts secured to the vehicle proper and the supporting sleeves attached to the lamp housing. The rubber being flexible or resilient absorbs a great detail of the impact vibrations. However, when the lamp is so positioned that the mounting bolt is disposed in a horizontal plane, there will be a considerable amount of rotational vibration due to the unbalanced condition of the lamp. This causes the light beam to objectionably move up and down. Since the lens, reflector, and related material are necessarily located in the front of the housing, the weight thereof is unevenly distributed and therefore torsional vibrations may occur owing to the difficulty of arranging the point of attachment of the support at the center of gravity of the lamp. Increasing the rigidity of the rubber may tend to decrease rotational vibrations but due to the lack of resiliency, failure may occur due to the jars and shocks to which the lamps are subjected.

It is an object of the present invention to provide a novel form of shock absorbing headlamp mounting that will minimize or entirely eliminate objectionable vibrations from occurring in said headlamp, thereby assuring effective and reliable operation thereof for long periods of time.

Another object is to provide a shock absorbing headlamp mounting which is so constructed as to not only minimize or entirely eliminate objectionable vibrations but due to the high resistance thereof to twisting, the light pattern of said headlamp will be prevented from excessive gyration.

A further object is to provide a novel cantilever type shock absorbing support for headlamps and the like.

A still further object is to provide novel mountings for headlamps which are simple in construction, economical in manufacture and durable in operation.

These and other objects and advantages will become more apparent as the description of the invention progresses.

Of the drawings—

Fig. 1 is a plan view, partly in section, of a headlight mounting embodying the present invention, certain parts thereof being broken away to more clearly show certain features thereof.

Fig. 2 is a cross sectional view taken substantially along line 2—2 of Fig. 1.

Figs. 3, 4 and 5 are views similar to that of Fig. 2, showing modifications of the present invention.

Referring to the drawings, A represents the side of a vehicle with a headlamp B mounted thereon. The headlamp B including its housing are of usual construction and the specific structure thereof except insofar as it cooperates with the mounting structure, hereinafter described, forms no part of the present invention. For purposes of illustration, the headlamp B includes a housing 2 having a pivotally mounted door 4 at the front thereof. A lamp 6 of the so called sealed beam type is resiliently supported by a pliable gasket 8 and secured in position by a clamping ring 10.

Housing 2 has provided at one side thereof an opening 11 through which a supporting tube 12 extends. The outer end of the tube 12 has formed thereon a shoulder 14 which abuts against the inner side of case 2 adjacent opening 11. The outer end of tube 12 is crimped over into engagement with the outer side of casing 2. Tube 12, accordingly is rigidly secured to casing 2. As will appear hereinafter, tube 12 is non-circular in cross-section and receives the reduced correspondingly shaped inner portion 18 of a cantilever type supporting member or bolt 20. A resilient sleeve 22 is disposed between tube 12 and the inner portion 18 of bolt 20, as shown in Fig. 2. This sleeve may have a cross-section corresponding to the space between the bolt 18 and tube 12. However, it has been found that since the sleeve 22 is pliable, any cross-sectional shape may be employed as long as said sleeve will be in intimate contact with both the bolt 18 and tube 12 when said sleeve is forced into position. The other threaded end 24 of bolt 20 extends through an opening 25 provided in vehicle body A. A pair of arcuate washers 26 and 27 are provided on the threaded portion 24 at either side of body A and lock nuts 28 and 29, engaging the opposite sides of washers 26 and 27, respectively. The washers are shaped to cooperate with the contour of the side of the vehicle A, and the nuts 28 and 29 when tightened hold the bolt 20 rigidly in place. The inner end of the bolt 20 has a tapped hole 27, provided therein receiving a screw 28' for securing the fitting 30 to the said bolt 20 and thereby providing a suitable ground for the light circuit to the vehicle A.

As shown in Fig. 2, tube 12, sleeve 22 and the inner portion 18 of bolt 20 are substantially square in cross-section. The sleeve 22 is held between bolt 20 and tube 12 by any suitable means. Although the sleeve may be vulcanized or bonded to said members, it has been found that the frictional forces created by forcing the sleeve into position under a high pressure are adequate to support the lamp. Thus, it will be seen that the sleeve resiliently supports the headlamp B while at the same time resisting torsional stresses.

By using a support for the headlamp which is non-circular in cross-section, the resilient material will permit the lamp unit to vibrate to some extent in a direction transverse to the bolt 20. Thus, the vibrations and impacts created by the motion of the vehicle will be effectively absorbed. The resilient mounting, however, owing to the non-circular construction thereof, effectively resists the tendency of the lamp to oscillate about the axis of bolt 20. Such rotational movements are resisted because of the non-circular construction of the mounting and also because of the fastening of the sleeve 22 to the tube 12 and to the inner portion 18 of bolt 20. Rotational vibration of lamp B is thus effectively controlled and long and efficient service of the mounting supports assured.

Each particular installation will present its own peculiar problems as to the amount of dampening required by the shock or impact vibrations as well as by the rotational vibrations. The size, thickness and composition of the resilient sleeve can be altered to vary the shock absorbing qualities of the mounting. By modifying the shape of the bolt, the sleeve, and the tube, it is also possible to provide a mounting having the desired qualities.

Fig. 3 shows a slight modification wherein bolt 20 is provided with a hexagonal inner portion 36, extending into a correspondingly shaped tube 38 secured to housing 2. A resilient sleeve 42 is secured to both tube 38 and inner portion 36 of bolt 20 by any suitable means. If so desired, the sleeve 42 may be given a cross-sectional shape similar to that of the tube 38 and bolt 36. However, since the sleeve is pliable it may have any cross-section which will permit it to intimately engage and grip the entire surface of the bolt 36 and tube 38 when it is forced into position.

Fig. 4 shows another modification wherein the inner lamp supporting portion 44 is circular at the center thereof with a pair of rounded diametrically disposed projections or fins 46 and 48 extending lengthwise thereof to give said portion a generally elliptical appearance. The lamp supporting tube 49 is similar in cross-section to said portion. A suitably shaped resilient sleeve 50 is disposed between the said tube and portion 44 of bolt 20 as in the previous constructions.

Fig. 5 shows a further modification wherein the inner lamp supporting portion 52 of bolt 20 is rounded at the center thereof and has a plurality of diametrically opposed substantially rectangular projections or fins 54 extending lengthwise thereof to give the bolt a substantially star or spider appearance. A lamp supporting tube 56 receives portion 52 and a suitably shaped resilient sleeve 58 extends between said tube and inner portion 52 of bolt 20. Thus it is apparent that any desired proportion between dampening of rotational and shock vibrations may be provided by varying the shape of the tube, the inner supporting portion or shank of the bolt and the associated resilient sleeve.

Although several embodiments have been illustrated and described herein, it will be apparent to those skilled in the art that the invention may be embodied in numerous other specific forms without departing from the true spirit thereof. While the mounting has been shown in connection with a vehicle headlight, it is apparent that it is adapted to resiliently mount any structure, especially those subjected to vibration. It is therefore to be understood that it is not intended to limit the invention to the embodiments disclosed, but only by the scope of the claims which follow.

What is claimed is:

1. A support for resiliently mounting a body with the center of gravity of said body laterally offset from the axis of said support, said support comprising an inner shank, the outer surface of said shank being substantially concentrically with said axis, a tube disposed concentrically about said shank with the inner surface thereof being substantially uniformly spaced from and similar to said outer surface, said surfaces having a non-circular cross-section in a plane normal to said axis, and a resilient sleeve disposed between said shank and said tube and being in intimate contact with said surfaces, all portions of said sleeve being of substantially uniform thickness.

2. In a horizontal support for resiliently mounting a lamp member on a mounting member with the center of gravity of said lamp member being laterally offset from the horizontal axis of said support, a vibration dampener comprising a shank adapted to be secured to one of said members in a substantially horizontal position, an outer surface on said shank, said outer surface being disposed substantially concentric with said axis, a tube disposed about said shank, an inner surface on said tube having a shape substantially similar to said outer surface, said inner surface being substantially uniformly spaced from said outer surface, said surfaces having portions thereof which are disposed at varying distances from said axis, and a resilient sleeve disposed between said shank and said tube and being in intimate contact with said surfaces.

3. In a vehicle having a headlight housing, a horizontal support for resiliently mounting said headlight housing on the side of said vehicle so that the center of gravity of said headlight housing is laterally offset from the horizontal axis of said support, said support comprising an inner shank having one end thereof secured to said vehicle and having the outer surface thereof disposed substantially concentrically about said axis, an outer tube disposed about said shank and being secured to said headlight housing, the inner surface of said tube being substantially uniformly spaced from said outer surface, each of said surfaces being substantially similar to each other and having portions thereof which are disposed at varying distances from said axis, and a resilient sleeve disposed between said shank and aid tube and being in intimate contact with said surfaces.

4. In a horizontal support for resiliently mounting a body with the center of gravity of said body laterally offset from the horizontal axis of said support, a vibration dampener comprising a shank adapted to be disposed in a substantially horizontal position with the outer surface thereof being substantially concentric with said axis, said shank member having a polygonal cross-section in a vertical plane, a tubular member disposed about said shank member with the inner surface thereof being substantially uniformly spaced from and similar to the exterior surface of said shank member, and a resilient sleeve disposed between said members and being in intimate contact with said surfaces.

5. In a horizontal support for resiliently mounting a lamp housing on a supporting structure with the center of gravity of said lamp housing being laterally offset from the horizontal axis of said support, a vibration dampener comprising a square shank member adapted to be secured to said supporting structure concentrically about said horizontal axis, a square tubular member disposed about said shank member with the inner surface thereof being substantially uniformly spaced from and similar to the outer surface of said shank member, and a resilient sleeve of substantially uniform thickness disposed between said members and being in intimate contact therewith.

6. In a horizontal support for resiliently mounting a lamp housing on a supporting structure with the center of gravity of said lamp housing being laterally offset from the horizontal axis of said support, a vibration dampener comprising a hexagonal shank member adapted to be secured to said supporting structure concentric with said horizontal axis, a hexagonal tubular member disposed about said shank member with the inner surface thereof being substantially uniformly spaced from and similar to the outer surface of said shank member, and a resilient sleeve of substantially uniform thickness disposed between said members and being in intimate contact with said surfaces.

7. In a horizontal support for resiliently mounting a body with the center of gravity of said body being laterally offset from the axis of said support, a vibration dampener comprising a shank adapted to be disposed in a substantially horizontal position with the outer surface thereof being substantially concentric with said horizontal axis, the outer surface of said shank having a plurality of fins projecting radially outwardly therefrom and extending longitudinally thereof, a tubular member disposed about said shank member with the inner surface thereof being substantially uniformly spaced from and similar to the outer surface of said shank member, said inner surface having a plurality of recesses positioned to receive said fins, and a resilient sleeve disposed between said members, said sleeve being in intimate contact with all portions of said surfaces.

8. In a horizontal support for resiliently mounting a lamp housing on a supporting structure with the center of gravity of said lamp housing laterally offset from a horizontal axis of said support, said support comprising an inner shank adapted to have one end thereof secured to said supporting structure concentric with said horizontal axis, the outer surface of said shank having a pair of diametrically aligned radial fins extending longitudinally thereof, an outer tube adapted to be secured to said lamp housing, said tube being disposed about said shank with the inner surface thereof being substantially uniformly spaced from and similar to said outer surface, said inner surface having a pair of recesses positioned to receive said fins, and a resilient sleeve disposed between said shank and said tube and being in intimate contact with all portions of said surfaces.

9. In a horizontal support for resiliently mounting a lamp housing on a supporting structure with the center of gravity of said lamp housing laterally offset from a horizontal axis of said support, said support comprising an inner shank adapted to have one end thereof secured to said supporting structure concentrically about said axis, the outer surface of said shank having four radial fins circumferentially spaced on said shank and extending longitudinally thereof, an outer tube disposed about said shank and being adapted to be secured to said lamp housing, the inner surface of said tube being substantially uniformly spaced from and similar to the outer surface of said shank, said inner surface having four longitudinal recesses positioned to receive said fins, and a resilient sleeve of substantially uniform thickness disposed between said shank and said tube and being in intimate contact with all portions of said surfaces.

10. A horizontal support adapted to be secured to a relatively fixed structure for resiliently mounting a body with the center of gravity of said body laterally offset from the horizontal axis of said support, said support comprising a member adapted to be secured to said fixed structure, a shank formed integrally on said member and having a cylindrical outer surface of non-circular cross section disposed substantially concentrically about said horizontal axis, the cross sectional area of said shank being substantially uniform along its entire length, a tube secured to said body having a non-circular cylindrical inner surface similar to said cylindrical outer surface, said tube being disposed about said shank with said inner and outer surfaces being substantially concentric, a resilient annular sleeve disposed between said inner and outer surfaces, said sleeve having cylindrical inner and outer surfaces shaped similar to said first inner and outer surfaces, all portions of said inner and outer surfaces on said sleeve being in intimate contact with said first inner and outer surfaces respectively.

References Cited in the file of this patent

UNITED STATES PATENTS

| 1,532,642 | Wright | Apr. 7, 1925 |
| 1,835,575 | Sanders | Dec. 8, 1931 |
| 1,940,686 | Lord | Dec. 26, 1933 |
| 2,126,704 | Schmidt | Aug. 16, 1938 |
| 2,187,923 | Winkleman | Jan. 23, 1940 |
| 2,341,821 | Schwinn | Feb. 15, 1944 |

FOREIGN PATENTS

| 210,639 | Switzerland | Oct. 1, 1940 |